United States Patent Office 3,247,229
Patented Apr. 19, 1966

3,247,229
SULFONATED 1,4-DIARYLALKYLAMINO
ANTHRAQUINONE DERIVATIVES
Josef Singer, Leverkusen-Bayerwerk, and Rudolf Schroter, Leverkusen, Germany, assignors to Farbenfabriken Bayer Aktiengesellschaft, Leverkusen, Germany, a German corporation
No Drawing. Filed Apr. 21, 1964, Ser. No. 361,585
5 Claims. (Cl. 260—373)

This application is a continuation-in-part of our co-pending application Serial No. 828,734, filed on July 22, 1959, and now abandoned.

The invention relates to the production of new sulfonated 1,4-diarylalkylamino anthraquinones. The object of the invention is a process for obtaining brilliant greenish blue dyestuffs which possess good general fastness properties and have more especially a good affinity from a neutral bath. More objects will appear hereinafter.

Dyestuffs of this type are technically important. Apart from their use as pure dyestuffs having a good even shade, they are chiefly important for the production of fast bright shades between yellow and blue by mixing a blue dyestuff component with a yellow or green component.

It is true that blue dyestuffs are known which possess more or less useful wet-fastness properties, but they do not meet the requirements of brilliancy or light fastness or neutral affinity. Other dyestuffs such as are indicated, e.g. in U.S. patent specification No. 2,204,749 and in German patent specification No. 765,601, possess a good brilliancy and some of them have a good fastness to light, but their wet fastness and neutral affinity are not satisfactory.

It has now been found that dyestuffs of the desired properties are obtained by reacting amines of the formula

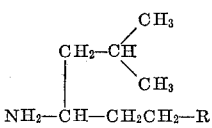

NH₂—CH—CH₂CH₂—R wherein R stands for a phenyl radical, e.g., phenyl,, chlorophenyl and lower alkylphenyl; with 1,4-dihydroxy- or 1,4-diamino-anthraquinones which may contain further hydroxyl groups in the 5-, 6- or 8-position and are present substantially in the leuco form, oxidizing and sulfonating the leuco compounds thus obtained, and acylating the free aromatic amino groups which may still be present.

The amines used according to the present invention may be obtained by known methods, by, for example, condensing benzaldehydes or cinnamic aldehydes with dialkyl ketones and catalytically converting the arylidene ketones thus formed into the saturated amines with ammonia and hydrogen. Some of the amines may also be obtained by aminating reduction of the saturated ketones derived from unsaturated ketones such as mesityl oxide or benzalacetone by the addition of aromatic hydrocarbons in the presence of Friedel-Crafts catalysts.

As alkyl radicals the amines according to the invention preferably contain alkyl groups such as isobutyl.

The reaction of the anthraquinones used according to the invention which may expediently be present to a large extent in the form of leuco compounds, with the amines according to the invention is advantageously carried out with an excess of amines and at an elevated temperature, for example at temperatures within the range of 50–150° C., preferably at 80–120° C., and, if desired, in the presence of diluents such as e.g. alcohols, glycols, methyl ether, pyridine or aromatic hydrocarbons and their halogen derivatives. When the reaction is completed, the leuco compounds formed are oxidized in conventional manner, for instance by the introduction of air or the addition of nitrobenzene, and the reaction product is subsequently sulfonated by known methods, for example with fuming sulphuric acid.

According to the process of the invention, blue dyestuffs are obtained which possess on animal fibres and polyamides an outstanding brightness and very good general fastness properties. Compared with known dyestuffs of the same shade, they especially excel in bettter wet fastness and to some extent also in better light fastness and a better affinity from a neutral bath.

The following examples are given for the purpose of illustrating the invention, the parts being parts by weight if not indicated otherwise.

Example 1

(a) 24 parts of leuco-1,4-dihydroxy-anthraquinone are added to a boiling mixture of 60 parts of 1-(2'-chlorophenyl)-3-amino-5-methylhexane (B.P. 153–155° C./11 mm. Hg) and 20 parts of isopropanol. After stirring under reflux for 5 hours, 100 parts of nitrobenzene and 3 parts of piperidine are added to the melt which is heated to 150° C. for about 1 hour. Portions boiling up to 110° C. are then distilled off in a water-jet vacuum and, after cooling, the blue nitrobenzene solution of the dyestuff obtained and having the constitution

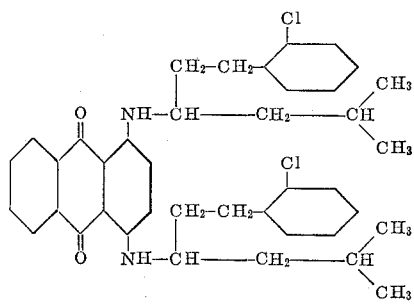

is run, while cooling with ice, into 250 parts of sulphuric acid monohydrate. After the addition of 150 parts of 20% oleum the dyestuff becomes water-soluble. The sulfonation mixture is poured into ice water thus obtaining a readily settling tarry mass, which, after decanting, is neutralized with sodium carbonate and freed from the adhering nitrobenzene by steam distillation. The dyestuff solution thus obtained is precipitated with common salt, the dyestuff is isolated in the form of its sodium salt and dried. It yields on wool from a neutral bath apart from a very good affinity very bright greenish blue dyeings which are fast to light and very fast to wet processing.

The 1-(2'-chlorophenyl)-3-amino-5-methylhexane used for the reaction may be obtained according to Example 1(c) by aminating hydrogenation from 1-(2'-chlorophenyl)-5-methylhexane-(1)-one-(3) (B.P. 176–181° C./ 13 mm. Hg). For the preparation of the latter a mixture of 281 parts of 2-chlorobenzaldehyde, 700 parts of methanol and 200 parts of methyl-isobutyl ketone is stirred for some time with a solution of 15 parts of potassium hydroxide in 100 parts of methanol. The solution is then neutralized, the condensation product separated by the addition of water and distilled.

(b) If instead of 1-(2'-chlorophenyl)-3-amino-5-methylhexane the corresponding 1-(3'- or 4'-chlorophenyl) derivative or 1-(4'-methylphenyl) derivative is used, similar dyestuffs are obtained.

(c) 24 parts of leuco-1,4-dihydroxy-anthraquinone, 60 parts of 1-phenyl-3-amino-5-methylhexane (B.P. 134–138° C./12 mm. Hg) are heated under reflux for 6 hours in 20 parts of isopropanol while introducing nitrogen.

The product is worked up as described in Example 3(a) and a dyestuff of the following constitution

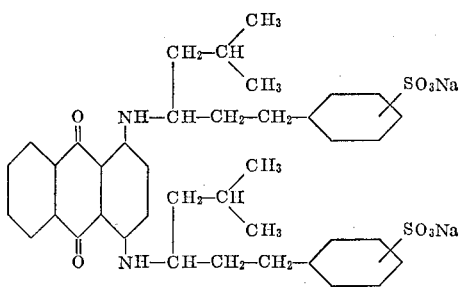

is obtained.

This dyestuff possesses a good affinity for wool from a neutral bath and dyes it in light-fast, bright greenish blue shades of good fastness to wet treatment.

(d) The dyeings on wool obtained with the dyestuffs according to the invention may be effected as follows:

A dyebath of 5000 parts of water, 5 parts of sodium sulphate, and 1 part of acetic acid is prepared from an aqueous solution of 1 part of the dyestff obtained according to Example 1(a) from leuco-1,4-dihydroxy-anthraquinone and 1-(2'-chlorophenyl)-3-amino-5-methylhexane. 100 grams of wool are introduced at about 30° C. into the dyebath which is slowly heated to the boil, kept boiling for 1 hour and finally slowly adding 1 part of acetic acid. The dyestuff readily draws onto the fiber and yields bright greenish blue dyeings.

Example 2

24 parts of leuco-1,4-dihydroxy-anthraquinone, 60 parts of 1-phenyl-5-amino-7-methyloctane (B.P. 143–147° C./11 mm. Hg) are reacted and worked up according to the process described in Example 1(a). A bright greenish blue dyestff of the constitution

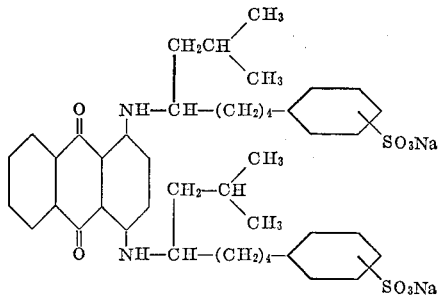

is obtained. It yields on wool dyeings of bright blue shades and good fastness to light and wet processing, having also a good affinity from a neutral bath.

Example 3

The reaction described in Example 1(c) is carried out with 25.5 parts of leuco-1,4,5-trihydroxy-anthraquinone instead of leuco-1,4-dihydroxy-anthraquinone. The resultant dyestff of the following constitution

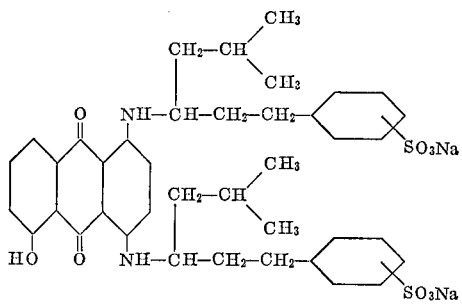

dyes, in comparison with the dyestuff obtained according to Example 1(a), in somewhat more greenish bright shades having about the same fastness properties.

Example 4

15 parts of leuco-1,4,5,8 - tetrahydroxy-anthraquinone, 60 parts of 1-phenyl-3-amino-5-methylhexane are stirred for 10 hours at 12 mm. Hg and worked up as described in Example 1(a). A blue dyestuff of the following constitution

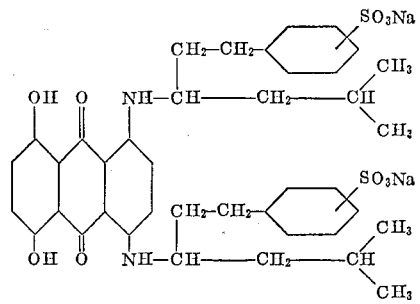

is obtained which dyes wool in very fast, intense greenish blue shades. The dyestuff possesses a good affinity to wool from a neutral bath.

We claim:

1. A dyestuff obtained by sulfonating with fuming sulfuric acid a compound of the formula

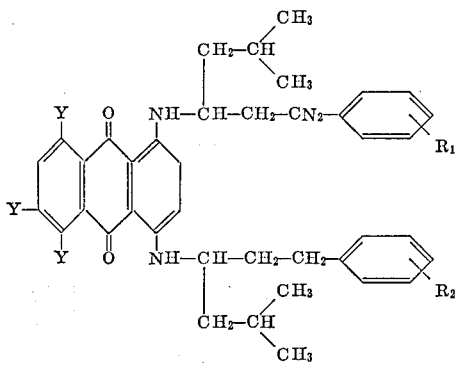

wherein the sulfonic acid groups are present in a phenyl nucleus; $R_1$ and $R_2$ are selected from the group consisting of hydrogen, chlorine and methyl; and each Y is a member selected from the group consisting of hydrogen and hydroxy.

2. A dyestuff obtained by sulfonating with fuming sulfuric acid a compound of the formula

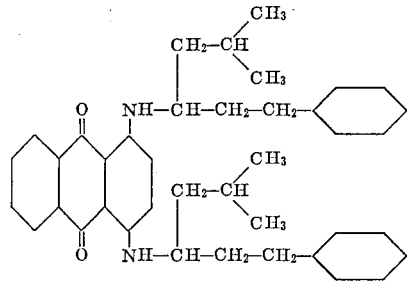

3. A dyestuff obtained by sulfonating with fuming sulfuric acid a compound of the formula

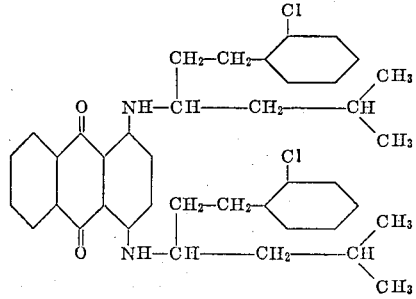

4. A dyestuff obtained by sulfonating with fuming sulfuric acid a compound of the formula
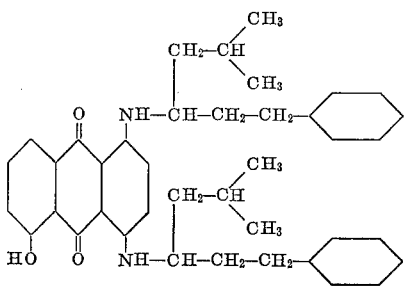
5. A dyestuff obtained by sulfonating with fuming sulfuric acid a compound of the formula
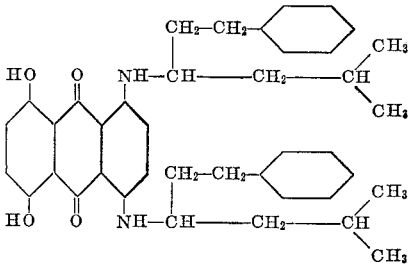
References Cited by the Examiner
UNITED STATES PATENTS
2,475,530  7/1949  Tatum _____ 260—371
FOREIGN PATENTS
491,493  9/1938  Great Britain.
LORRAINE A. WEINBERGER, *Primary Examiner.*